L. H. GRISELL.
SHOCK ABSORBER.
APPLICATION FILED MAY 8, 1915.
1,194,998.
Patented Aug. 15, 1916.
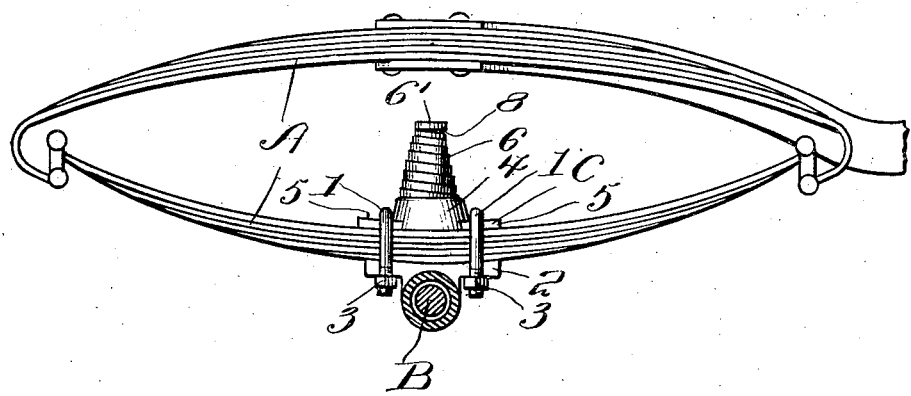
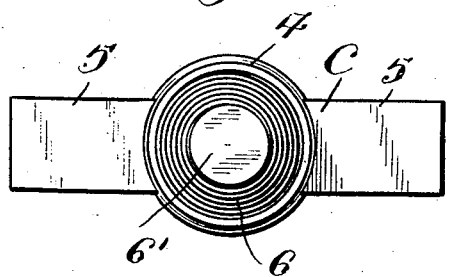
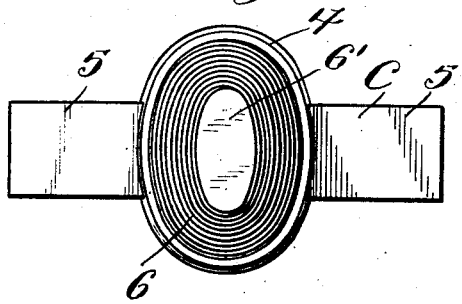
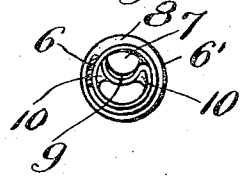
Witnesses
J. L. Wright.
P. M. Smith.
Inventor
Lowell H. Grisell.
By Victor J. Evans
Attorney

UNITED STATES PATENT OFFICE.

LOWELL HOBART GRISELL, OF BALBEC, INDIANA.

SHOCK-ABSORBER.

1,194,998.  Specification of Letters Patent.  Patented Aug. 15, 1916.

Application filed May 8, 1915.  Serial No. 26,859.

*To all whom it may concern:*

Be it known that I, LOWELL HOBART GRISELL, a citizen of the United States, residing at Balbec, in the county of Jay and State of Indiana, have invented new and useful Improvements in Shock-Absorbers, of which the following is a specification.

This invention relates to shock absorbers and is especially designed for use upon automobiles, motor trucks and other vehicles in which the body is supported upon the springs secured to and in turn supported by the axles of the vehicle, the object of the present invention being to produce a mechanical shock absorber as contra-distinguished from the ordinary rubber bumper now in common use, which shock absorber is adapted to be fastened in place by the usual clips which secure the vehicle spring to the axle, said shock absorber embodying in connection with a particular form of spring, a cap or impact head for said spring having a novel relation to the final convolution of the spring whereby said cap is retained in place relatively to the spring.

With the above and other objects in view, the invention consists in the novel construction, combination and arrangement of parts, as herein described, illustrated and claimed.

In the accompanying drawings: Figure 1 is a side elevation of the shock absorber in its applied relation to a vehicle spring and axle. Fig. 2 is a plan view of one form of shock absorber. Fig. 3 is a similar view of another form of shock absorber. Fig. 4 is a plan view of the inner end of the spring cap or impact head showing the manner of securing said cap and spring in fixed relation to each other.

Referring to the drawings A generally designates an ordinary elliptic spring such as is commonly used in vehicles, and B a vehicle axle to which the bottom portion of the spring is secured by means of clips 1 which embrace the bottom portion of the spring and arranged at opposite sides of the axle, the clips having their ends passed through a washer plate 2 extending under the axle and the ends of the clips being threaded to receive retaining nuts 3, all of said parts being of the usual construction.

The shock absorber of this invention comprises a base designated generally at C and comprising a central cup or socket 4 having at opposite sides thereof and formed integrally therewith projecting lugs or feet 5 which as shown in Fig. 1 are inserted beneath the clips which fasten the spring to the axle, the said clips thus serving the double purpose of securing the spring and also the shock absorber to the axle.

6 designates a spiral or circumvolute spring which has a general cone shape so that all of the convolutions thereof are adapted to nest within each other as the spring is compressed, thus enabling the spring to occupy but small space when fully compressed. The spring as a whole is preferably formed of a flat spring strip and is coiled in tapering or conical form, the larger end or lower terminal convolution of the spring being of proper size to fit tightly within the cup or socket above referred to in which it is fastened in any suitable manner.

6′ designates a spring cap or impact head which is reduced for a portion of its length to form a shank 7 and a shoulder 8 which bears against the upper or smaller convolution of the spring. The shank 7 is formed with an open slot 9 extending transversely therethrough and expanded at opposite sides of the shank as shown at 10. The adjacent extremity of the spring is bent into ogee form as shown so as to enable a portion of the extremity of the spring to be inserted through the slot 9 while the hooked extremity of the spring lies in one of the widened or expanded end portions of the slot thereby preventing the possible withdrawal of the extremity of the spring laterally from the slot in the shank of the cap or impact head. In this way, the cap or head is securely fastened to the smaller end of the spring.

In the preferred embodiment of this invention, the shock absorbing spring is coiled in oblong or elliptical form the major axis of the ellipse extending transversely of the vehicle spring to impart greater lateral stability to the vehicle body, while in another form the convolutions are substantially round or circular. By reason of the construction described and the relation of the convolutions of the coil to each other, the shock absorbing spring is rendered self-cleaning in that the convolutions move or slide in contact with each other thereby scraping off any mud, dirt, ice or other foreign matter and thereby keeping the spring in perfect working condition at all times.

What I claim is:—

A shock absorber for the purpose specified, comprising a base embodying an elliptical cup, means for securing said cup to a vehicle spring so that the major axis of the cup will extend transversely of the vehicle spring, a cone-shaped circumvolute shock absorbing spring elliptical in cross section having the terminal convolution at the larger end thereof seated in said cup, and an elliptical impact cup provided with a shank secured to the extremity of the terminal convolution at the smaller end of said spring.

In testimony whereof I affix my signature in presence of two witnesses.

LOWELL HOBART GRISELL.

Witnesses:
 JOHN L. CARY,
 CASTA M. ENOCHS.